United States Patent [19]

Elson et al.

[11] Patent Number: 4,836,758
[45] Date of Patent: Jun. 6, 1989

[54] SCROLL COMPRESSOR WITH CANTED DRIVE BUSHING SURFACE

[75] Inventors: John P. Elson; Stephen F. Kramp, both of Sidney, Ohio

[73] Assignee: Copeland Corporation, Sidney, Ohio

[21] Appl. No.: 123,184

[22] Filed: Nov. 20, 1987

[51] Int. Cl.[4] .................... F01C 1/04; F01C 17/06; F16C 11/02; F16C 25/02
[52] U.S. Cl. .................................. 418/55; 418/57; 418/182; 384/271; 384/447; 464/112; 464/132
[58] Field of Search .................. 418/55, 57, 182; 384/192, 193, 271, 447; 464/128, 132, 179, 112; 403/351

[56] References Cited

U.S. PATENT DOCUMENTS

| | | |
|---|---|---|
| 67,638 | 8/1867 | Dotterer . |
| 2,332,232 | 10/1943 | Kauffman, 2d . |
| 2,597,548 | 5/1952 | Traylor, Jr. . |
| 2,883,738 | 4/1959 | Morrow . |
| 2,905,511 | 9/1959 | Cerness . |
| 2,988,405 | 6/1961 | Scheldorf . |
| 3,004,323 | 10/1961 | Pitner . |
| 3,679,276 | 7/1972 | Stenlud . |
| 3,784,264 | 1/1974 | Jackson, Jr. . |
| 4,005,915 | 2/1977 | Canfield . |
| 4,169,637 | 10/1979 | Voitas . |
| 4,222,617 | 9/1980 | Romberg . |
| 4,224,008 | 9/1980 | Haentjens . |
| 4,240,682 | 12/1980 | Benson . |
| 4,561,707 | 12/1985 | Jackson . |
| 4,561,787 | 12/1985 | Ehrentraut et al. . |
| 4,579,465 | 4/1986 | Horner . |
| 4,640,630 | 2/1987 | Yoshioka et al. . |
| 5,645,430 | 2/1987 | Carleton . |

FOREIGN PATENT DOCUMENTS

| | | | |
|---|---|---|---|
| 528595 | 7/1956 | Canada | 384/192 |
| 58-172402 | 10/1983 | Japan | 418/182 |
| 62-3186 | 1/1987 | Japan . | |
| 62-159782 | 7/1987 | Japan . | |
| 62-159783 | 7/1987 | Japan . | |

Primary Examiner—John J. Vrablik
Attorney, Agent, or Firm—Harness, Dickey & Pierce

[57] ABSTRACT

A scroll machine having an eccentric crank pin on a crankshaft disposed nonrotatably in the bore of a drive busing for driving the orbiting scroll of the compressor. A flat on the crank pin drivingly engages a flat in the bore, one flat being at an acute angle to the normal cranksahft axis so that when the crankshaft deflects under normal loads the flats come into better contact with one another to reduce unwanted wear. Several other embodiments are also disclosed.

17 Claims, 2 Drawing Sheets

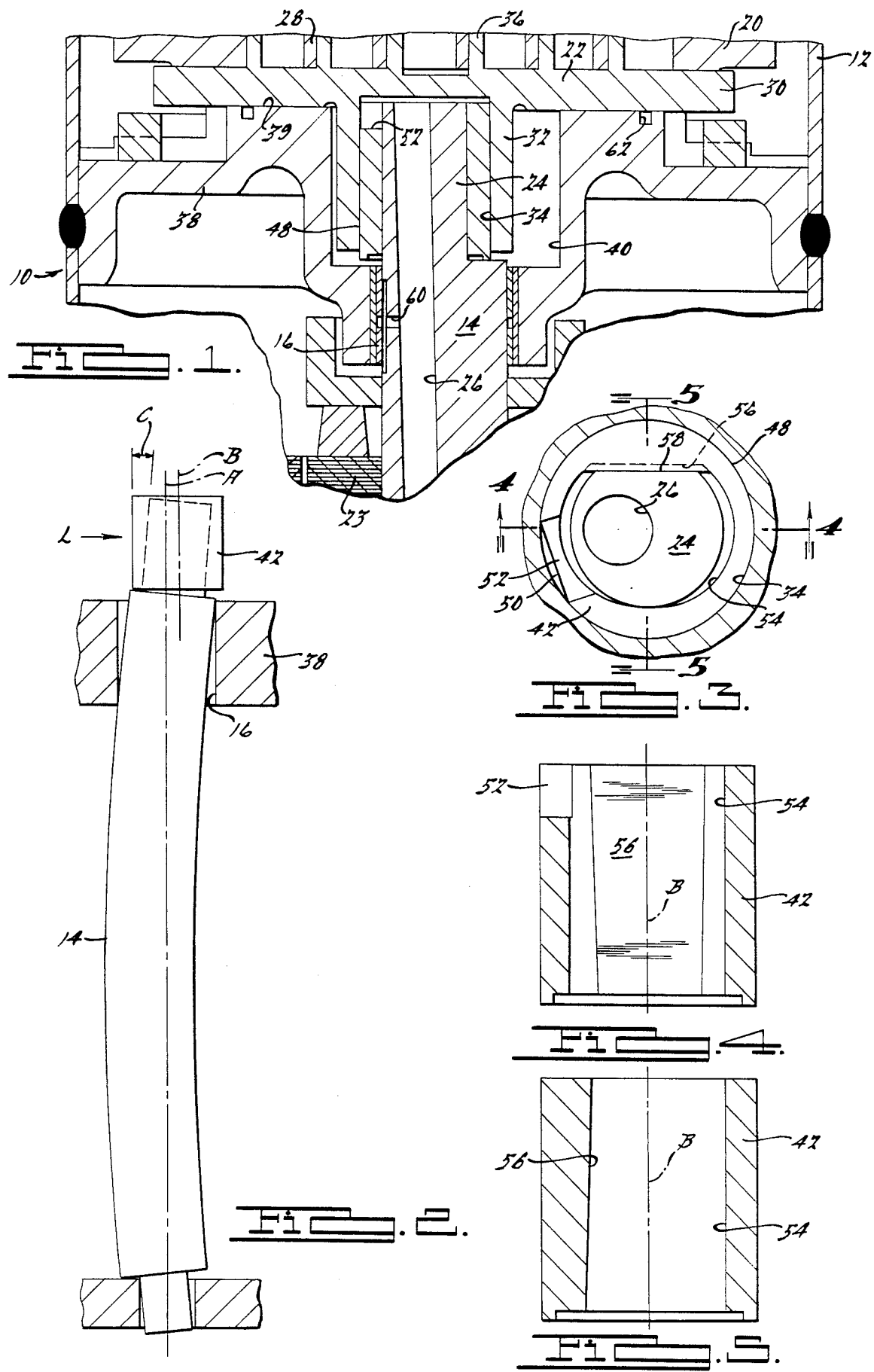

SCROLL COMPRESSOR WITH CANTED DRIVE BUSHING SURFACE

This invention relates to scroll machines, and more particularly to a scroll compressor having an improved crank pin drive bearing.

A common type scroll compressor comprises non-orbiting and orbiting scroll members having interfitting spiral vanes, the flanks of the vane on one member being in sealing contact with the flanks of the vane on the other member. The vanes define moving fluid containing pockets which changes in volume as one scroll member orbits with respect to the other scroll member.

Orbital movement is generally provided by an elongated axial crankshaft journaled adjacent its opposite ends for rotation in respective bearings of the compressor. One end commonly has an eccentric crank pin disposed in a drive bearing mounted in a hub on the orbiting scroll member, whereby rotation of the crank causes the orbiting scroll member to orbit with respect to the non-orbiting scroll member. In a radially compliant drive a bushing may be provided between the crank pin and hub bearing. As loading increases, due to inertia and compressed gas forces, the crankshaft tends to deflect or bend relative to its at-rest condition, which can result in the eccentric crank pin becoming misaligned with its bearing, thereby causing point contact rather than line or area contact in the bearing. Such loading is undesirable because it prevents proper lubrication and significantly increases the possibility of damaging wear.

In accordance with this invention there is provided a crank pin bearing arrangement which assures that at least normal line or area contact is provided between all loaded bearing surfaces disposed between the crank pin and the orbiting scroll under all normal operating conditions. Advantages of the present arrangement include elimination of point contact between driving and driven members with an attendant reduction of wear, and a reduction in the tendency of deflection of the crank pin causing tilting of the drive bearing relative to the orbiting scroll member. Another significant advantage of the arrangement of the present invention is a reduction in power consumption under normal operating conditions.

Other advantages and features will become apparent from the following specification taken in connection with the accompanying drawings.

BRIEF DESCRIPTION OF THE DRAWINGS

FIG. 1 is a fragmentary vertical section view of a scroll compressor having an improved drive bearing arrangement in accordance with this invention;

FIG. 2 is a diagrammatic view showing in grossly exaggerated form the deflection of a scroll compressor crankshaft embodying the principals of the present invention under load;

FIG. 3 is a top view of the drive bearing arrangement of the present invention;

FIG. 4 is a sectional view taken along line 4—4 in FIG. 3 showing the drive bushing only;

FIG. 5 is a sectional view taken along line 5—5 in FIG. 3 showing the drive bushing only;

DESCRIPTION OF THE PREFERRED EMBODIMENTS

Figure 6:
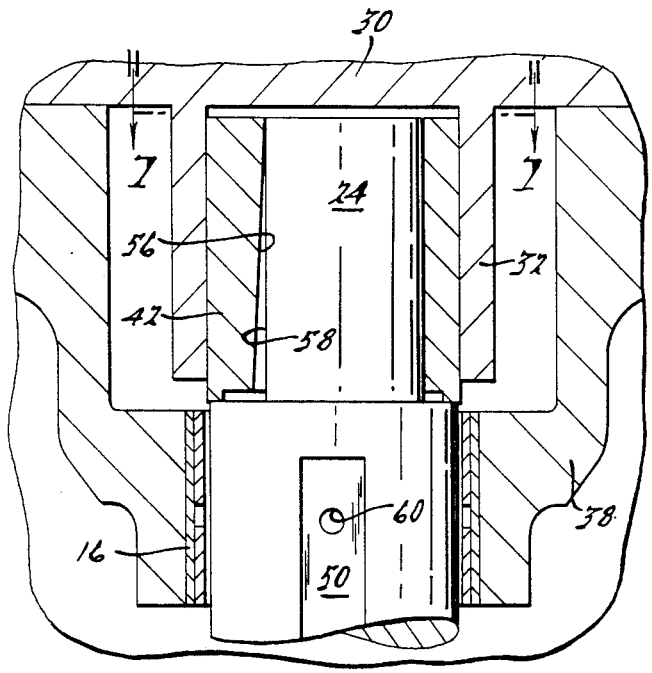
FIG. 6 is an enlarged view from the left side of a portion of the apparatus of FIG. 1 showing in exaggerated form the crank pin and bearing in a static or at rest condition.

Although the principals of the present invention may be applied to many different types of machines driven by a journalled crankshaft having a crank pin at one end, for exemplary purposes the present invention is disclosed herein embodied in a hermetic scroll-type compressor 10 which is particularly suited to the compression of refrigerant for air conditioning and refrigeration machines. A machine of this specific type is disclosed in assignee's copending application for Pat. Ser. No. 899,003, filed Aug. 22, 1986 entitled Scroll-Type Machine, the disclosure of which is expressly incorporated herein by reference.

Scroll compressor 10 includes a shell 12 having at its lower end a lubricating oil sump (not shown), a vertically disposed crankshaft 14 having its opposite end portions rotatably journalled for rotation, respectively, in an upper bearing 16 and in a complementary lower bearing (not specifically shown), a scroll assembly including a non-orbiting scroll member 20 and an orbiting scroll member 22, a motor 23 for rotatably driving the crankshaft, and an eccentric crank pin 24 extending from the upper end of the crankshaft for driving the orbiting scroll. The usual oil feed passage 26 extends axially eccentrically through the crankshaft to lubricate the respective parts of the machine from the sump. For a greater understanding of these details of construction refer to the above-referenced application for patent.

Non-orbiting scroll member 20 has a spiral wrap 28. Orbiting scroll member 22 includes an end plate 30 having a cylindrical hub 32 provided with a cylindrical bearing journal 34 extending downwardly from one side and a spiral wrap 36 upstanding from the other side, scroll wraps 28 and 36 interfitting within one another in the usual manner. A compressor body 38 is secured to the shell and supports orbiting scroll member 22 on a thrust surface 39. It also includes an annular chamber 40 which receives hub 32.

A generally cylindrical drive bushing 42 (which provides radial compliance as set forth in the above-referenced application for patent) is journalled in hub 32 for diving the orbital scroll, the bushing having an outer periphery 48 rotatably engaging journal 34 and including a flat portion 50, an axial notch 52 axially aligned with flat portion 50, and a central bore 54. Bore 54 is generally cylindrical and oval in cross-section and in accordance with this invention includes an axial flat driven surface 56 which is disposed in a plane canted or tilted a small acute angle "C" with respect to the center axis of peripheral wall 48, rather than parallel thereto as in the prior design disclosed in the above-referenced patent application. Crank pin 24 is generally cylindrical in cross-section and has an axial flat driving surface 58 adapted to drivingly engage flat surface 56. There is clearance between the remainder of crank pin 24 and bore 54 to permit surfaces 56 and 58 to slide with respect to one another to provide radial compliance to the drive.

Figure 9:
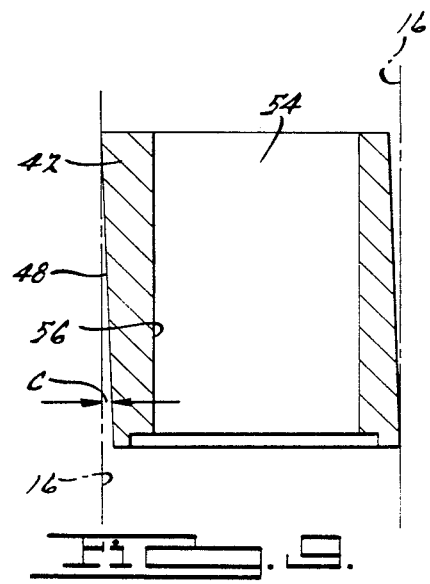
FIG. 9 is a view similar to FIG. 5 showing another embodiment of the present invention.
Figure 8:
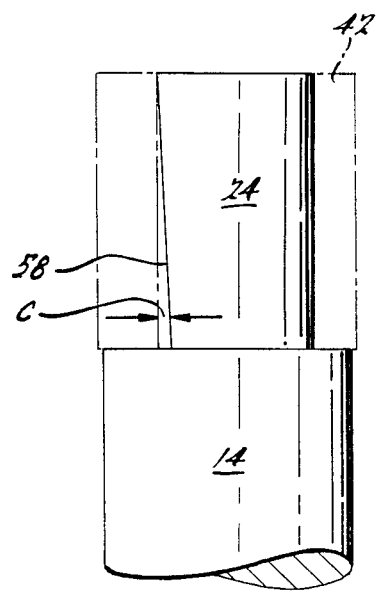
FIG. 8 shows an alternate embodiment of the present invention.

It should be appreciated that the inclined flat surface could alternatively be on the crank pin flat 58, as shown in FIG. 8, or the same result can also be obtained by generating the bushing outside diameter (i.e. surface 48) about a slightly canted axis with respect to the center axis of bore 54 and flat 58, as shown in FIG. 9.

Lubrication for the scroll assembly is provided by a radial passage 60 which receives oil from passage 26 and supplies it to upper bearing 16, and an annular groove 62 which receives oil from passage 26 via passages (not shown) in compressor body 38 to lubricate the orbiting scroll thrust surface. Further, oil is pumped by passage 26 to the top of the crank pin from which it is thrown radially outwardly by centrifugal force and collected in notch 52, from which it flows downwardly into the clearance space between crank pin 24 and bore 54 and between bore 34 and flat surface 50.

Figure 7:
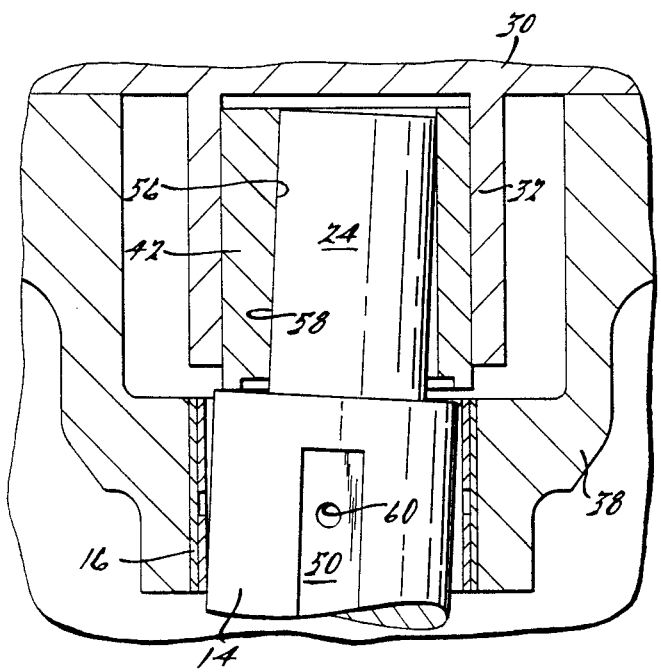
FIG. 7 is an enlarged view from the left side of a portion of the apparatus of FIG. 1 showing in exaggerated form the crank pin under normal operating conditions.

The significance of having one of the driving/driven flats acutely angled is best understood with reference to FIGS. 2, 6 and 7. When the compressor reaches its normal operating condition, the driving load on the crank pin, caused primarily by the radial separating forces created by the compressed gas and indicated at "L", causes the crankshaft to bend as shown in exaggerated form, whereby the end portions of the crankshaft will be at an acute angle relative to its normal center axis when in its at-rest condition, indicated at "A". In this condition, if the angle of canting is properly chosen crank pin flat 58 will fully engage bushing flat 56 and bushing 42 will be properly aligned. Angle "C" can be calculated or can be chosen emperically by increasing it progressively from 0° until compressor power consumption for the desired operating point has minimized. It is usually a very small angle, in the order of 0.125° to .50° in one compressor in which the concept has been tested.

Similar canting of the main crankshaft bearings is not believed necessary, even though they will be similarly misaligned, because both of them are disposed in cooler and easier to lubricate zones of the compressor and have larger bearing areas.

While it will be apparent that the preferred embodiments of the invention disclosed are well calculated to provide the advantages above stated, it will be appreciated that the invention is susceptible to modification, variation and change without departing from the proper scope or fair meaning of the subjoined claims.

What is claimed is:

1. A scroll type machine comprising an orbiting scroll member having a bore defining a journal for driving said scroll member in an orbital path, a non-orbiting scroll member mated with said orbiting scroll member, a rotatably driven axially extending crankshaft having an eccentric crank pin including an outer driving surface, and a drive bushing having an axial bore receiving said crank pin, said bore defining an inner bushing driving surface, said bushing further having an outer cylindrical bushing driving surface disposed in said orbiting scroll member journal, portions of said outer driving surface, said inner bushing driving surface, said outer cylindrical bushing driving surface and said journal cooperating with one another whereby rotation of said crankshaft is operative to effect orbital movement of said orbiting scroll member with respect to said non-orbiting scroll member characterized in that one of said outer driving surface, said inner bushing driving surface and said outer cylindrical bushing driving surface is canted at a substantially constant angle over the axial length of its cooperating portion with respect to the axis of said crankshaft when said crankshaft is at rest, said angle being chosen such that curvature of the crankshaft caused by normal driving loads on said crank pin will cause said canted cooperating portion to mate with an opposed cooperating portion of said outer driving surface, inner bushing driving surface and outer cylindrical bushing driving surface to a greater degree on its loaded side than when said crankshaft is at rest.

2. The machine as recited in claim 1 wherein said canted cooperating portion is on said inner bushing driving surface.

3. The machine as recited in claim 1 wherein said canted cooperating portion is on said outer driving surface.

4. The machine as recited in claim 1 wherein said canted cooperating portion is on said outer cylindrical bushing driving surface.

5. The machine as recited in claim 1 wherein said inner bushing driving surface and said outer driving surface are flat.

6. The machine as recited in claim 1 wherein said angle is selected to correspond to a minimum power point for said machine at a specific load condition.

7. A scroll type machine comprising an orbiting scroll member having a bore defining a journal for driving said scroll member in an orbital path, a non-orbiting scroll member mated with said orbiting scroll member, a rotatably driven axially extending crankshaft having an eccentric crank pin at one end, and a drive bushing having an axial bore receiving said crank pin and being rotatably disposed in said orbiting scroll member journal, characterized in that said bore and crank pin have opposed engaging drive surfaces, one of said surfaces being canted at a substantially constant angle over its axial length with respect to said crankshaft axis when said crankshaft is at rest, said angle being chosen such that curvature of the crankshaft caused by normal driving loads on said crank pin will cause said canted surface to mate with said other drive surface to a greater degree on its loaded side than when said crankshaft is at rest.

8. The machine as recited in claim 7 wherein the line of intersection of said canted drive surface and a plane containing said crankshaft axis is canted with respect to said crankshaft axis.

9. The machine as recited in claim 8 wherein said line of intersection is canted at an acute angle.

10. The machine as recited in claim 9 wherein said angle ranges from 0.125° to 0.500°.

11. The machine as recited in claim 7 wherein said canted surface is on said drive bushing.

12. The machine as recited in claim 7 wherein said canted surface is on said crank pin.

13. The machine as recited in claim 7 wherein said drive surfaces are flat.

14. The machine as recited in claim 13 wherein said canted surface is on said drive bushing.

15. The machine as recited in claim 13 wherein said canted surface is on said crank pin.

16. The machine as recited in claim 7 wherein said angle is selected to correspond to a minimum power point for said machine at a specific load condition.

17. A scroll type machine comprising an orbiting scroll member having a bore defining a journal for driving said scroll member in an orbital path, a non-orbiting scroll member mated with said orbiting scroll member, a rotatably driven axially extending crankshaft having an eccentric crank pin at one end, and a drive bushing having an axial bore receiving said crank pin and an outside cylindrical surface rotatably disposed in said orbiting scroll member journal, characterized in that said outside cylindrical surface is generated about a center axis which is canted at a substantially constant angle over its length with respect to said crankshaft axis when said crankshaft is at rest, said angle being chosen such that curvature of the crankshaft caused by normal driving loads on said crank pin will cause said cylindrical surface to mate with said journal to a greater degree on its loaded side than when said crankshaft is at rest.

* * * * *

UNITED STATES PATENT AND TRADEMARK OFFICE
CERTIFICATE OF CORRECTION

PATENT NO. : 4,836,758
DATED : June 6, 1989
INVENTOR(S) : John P. Elson and Stephen F. Kramp It is certified that error appears in the above-identified patent and that said Letters Patent is hereby corrected as shown below:

In the Abstract, line 3, "busing" should be -- bushing --.

In the Abstract, line 6, "cranksahft" should be -- crankshaft --.

In the references: "5,645,430" should be -- 4,645,430 --.

Column 2, line 50, "diving" should be -- driving --.

Column 2, line 50, "orbital" should be -- orbiting --.

Signed and Sealed this

Twenty-seventh Day of February, 1990

*Attest:*

JEFFREY M. SAMUELS

*Attesting Officer*   *Acting Commissioner of Patents and Trademarks*